United States Patent

Krause

[15] 3,637,927

[45] Jan. 25, 1972

[54] COMPARING TELEVISION SIGNALS WITH VARIED THRESHOLD AND PRODUCING BINARY SIGNALS

[72] Inventor: Gerhard Krause, Ebersberg B. Munchen, Germany

[73] Assignee: Fernseh GmbH, Darmstadt, Germany

[22] Filed: Nov. 12, 1969

[21] Appl. No.: 875,771

[30] Foreign Application Priority Data

Nov. 16, 1968 Germany ....................P 18 09 357.7

[52] U.S. Cl. ..........................................178/6, 178/DIG. 3

[51] Int. Cl. ..........................................H04h 7/10

[58] Field of Search ..................178/DIG. 3; 179/15, 15.55; 325/38

[56] References Cited

UNITED STATES PATENTS

| | | | |
|---|---|---|---|
| 1,790,722 | 2/1931 | Ranger | 178/DIG. 3 |
| 2,541,023 | 2/1951 | Beatty | 179/15 AB |
| 3,042,754 | 7/1962 | McMann | 179/15 AB |
| 3,215,773 | 11/1965 | Chatten et al. | 178/DIG. 3 |

*Primary Examiner*—Richard Murray
*Assistant Examiner*—Barry Leibowitz
*Attorney*—Littlepage, Quaintance, Wray & Aisenberg

[57] ABSTRACT

A reference voltage is cyclically varied within a range of dark and bright television picture signals. Binary one signals are produced when an instantaneous picture brightness signal voltage is higher, i.e. brighter, than the instantaneous level of the cyclically varied reference voltage. Zeros indicate that the instantaneous value of the television signal is below the corresponding instantaneous level of the reference voltage. The binary signals are amplified when necessary, and are stored or transmitted to a receiver. The binary inputs are used directly in a conventional receiver, permitting the eye to integrate closely adjacent signals to distinguish levels of brightness.

20 Claims, 15 Drawing Figures

Inventor:
Gerhard Krause
by
Littlepage, Quaintance Wray & Aisenberg
Attorneys

Inventor:
Gerhard Krause
by
Littlepage, Quaintance, Wray & Aisenberg
Attorneys

Inventor:
Gerhard Krause by
Littlepage, Quaintance, Wray & Aisenberg
Attorneys

Inventor:
Gerhard Krause
by
Littlepage, Quaintance, Wray & Aisenberg
Attorneys

Inventor:
Gerhard Krause
by
Littlepage, Quaintance, Wray & Aisenberg
Attorneys

COMPARING TELEVISION SIGNALS WITH VARIED THRESHOLD AND PRODUCING BINARY SIGNALS

BACKGROUND OF THE INVENTION

1. Field of the Invention

The invention relates to a method and system for transmitting and storing television signals wherein the television signals are converted into binary signals.

2. Description of the Prior Art

In both the transmission and the storage of electrical signals, a degrading of the signal-to-noise ratio occurs. This becomes apparent in a particularly disturbing manner when the transmission takes place over great distances with low signal power. In such circumstances it is advantageous to carry out the transmission with the aid of binary signals, with which it is possible, using simple limiting circuits, to eliminate disturbance voltages and amplitude fluctuations. The conditions are similar in the storage of signals. In fact many storage media allow only the storage of binary signals.

However, the known methods for the binary transmission of analog signals require costly electronic circuitry, particularly for analog-to-binary signal conversion. These known methods use all types of pulse modulation except pulse-amplitude modulation, which is not a binary transmission method.

SUMMARY OF THE INVENTION

The purpose of the present invention is to provide a low-cost method and system for the binary transmission and storage of television signals.

The binary signals are created at a first level when the television signals are greater than a threshold value and are created at a second level when the television signals are smaller than the threshold value. The threshold value assumes (within the amplitude range of the television signals) different values which periodically succeed each other in steps.

The invention requires only a small capital expenditure for technical equipment at the transmission side. In the reproduction of the signals, ingenious use is made of the integration ability of the human eye so that practically no additional capital expense is required for converting the binary signals back into analog signals.

BRIEF DESCRIPTION OF THE DRAWINGS

The invention will now be explained in more detail with reference to the accompanying drawings, as follows.

Equivalent parts are indicated in the figures with the same reference characters.

DESCRIPTION OF THE PREFERRED EMBODIMENT

Figure 1:
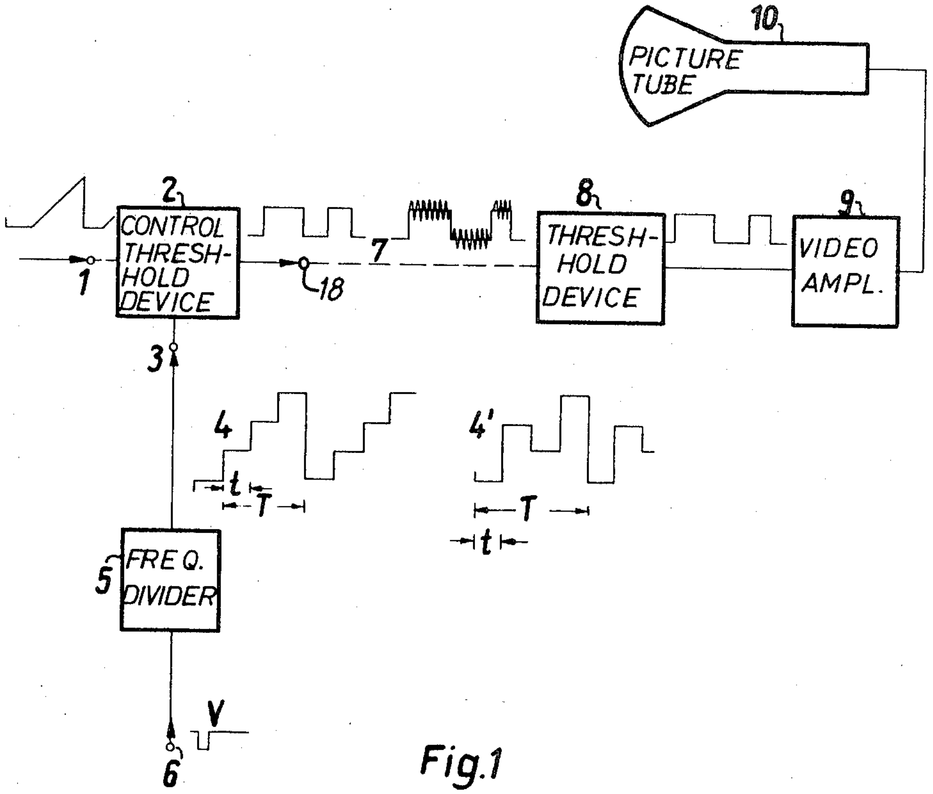
FIG. 1 is a schematic block diagram of a transmission path according to the invention, including a transmitter and a receiver.

In the circuit arrangement according to FIG. 1, a television signal is fed in at point 1. This television signal is represented schematically by a sawtooth voltage with blanking gaps. The signal arrives at a controllable threshold value device 2, whose threshold value is determined by a control voltage which is supplied to the device 2 at point 3. The time curve of the control voltage is represented at 4 as a stepped curve. This voltage is produced by a frequency divider 5, to which a vertical frequency pulse V is supplied at the point 6. Under the European television standard this vertical frequency pulse has a sequence frequency of 50 Hz., but the system is easily adaptable for any other television standard. If as is represented by waveform 4, four brightness levels of the television signal are distinguishable, then there will also be produced a four-level stepped curve. The control-voltage repetition frequency of 12.5 Hz. corresponds to a time-period T of the entire step curve such that $T$=80 ms. The duration $t$ of one step therefore amounts to 20 ms.

The output voltage 7 of the threshold value device 2 is transmitted to the receiver. This output voltage is at one binary level when the television signal is smaller than the particular adjusted threshold value, and is at a second level when the television signal is larger than the threshold value. The output signals from the controllable threshold value device 2 are also suitable for recording upon recording media.

For receiving the transmitted signals, or for reproduction of the recorded signals, it is possible to employ the conventional means used for the reproduction of television signals. These are, in particular, a video amplifier 9 and picture tube 10.

For the bright parts of the television picture, binary one signals are transmitted more frequently than for the dark places. For example, for portions of the television signal having an amplitude which exceeds only the lowest level of the step curve represented at 4, binary one signals are delivered by the threshold value device for only one quarter of the duration of the time period of the control voltage. However, for the parts of the television signal which correspond to the brightest parts of the picture, and which exceed all of the levels of the control voltage, binary one signals are delivered during the entire period of the control voltage. Because of the integrating ability of the human eye, more frequent reproduction on the screen of reproduction tube 10 is interpreted as a brighter reproduction. The brightness values of the television signal are therefore correctly reproduced notwithstanding the subdivision into steps.

For suppressing noise voltages and amplitude fluctuations resulting from transmission or storage of the signals, a threshold value device 8, whose threshold value can be adjustably fixed, is provided in the path of the signals in the receiver.

In step curve 4, the individual steps of the control voltage are arranged according to increasing amplitude. Amplitude values of the television signal which are not greater than all of the step levels of the voltage are transmitted at a repetition frequency which corresponds to the frequency of the control voltage. For these amplitude values a flickering will therefore result. To diminish this flickering the amplitude steps of the control voltage can also be arranged in a different manner, as is shown for example by waveform 4′. In this case an amplitude value which exceeds, for example, only the first two steps, is transmitted within the period T of the control voltage twice with the same time spacing, while in the case of the control voltage curve according to waveform 4′, the time spacings are unequal. Therefore, the smallest frequency contained in the ascending signals when using the control voltage according to waveform 4′ is higher than the frequency obtained when using the control voltage according to waveform 4.

A still further reduction of the flicker problem can be achieved by arranging for the lower level steps to occur more frequently than the upper level steps in one period of the control voltage. Another improvement can be achieved by using a storage picture tube for reproduction. This may be a picture tube having a persistence characteristic.

In the control voltages represented in FIG. 1, the threshold value is constant for each half frame. It may, however, also be maintained constant for each whole frame or for a line duration. In the latter case, a line structure will be seen in the reproduced television picture instead of a flickering effect, but this disturbing effect may be reduced by suitable synchronization between the threshold value voltage and the vertical frequency so that lines which correspond in space are associated in successive frames with different threshold values.

The steps can also be switched at a frequency which is higher than the line frequency. In this case, also with suitable synchronization, the resulting pattern does not have a disturbing effect.

Figure 2:
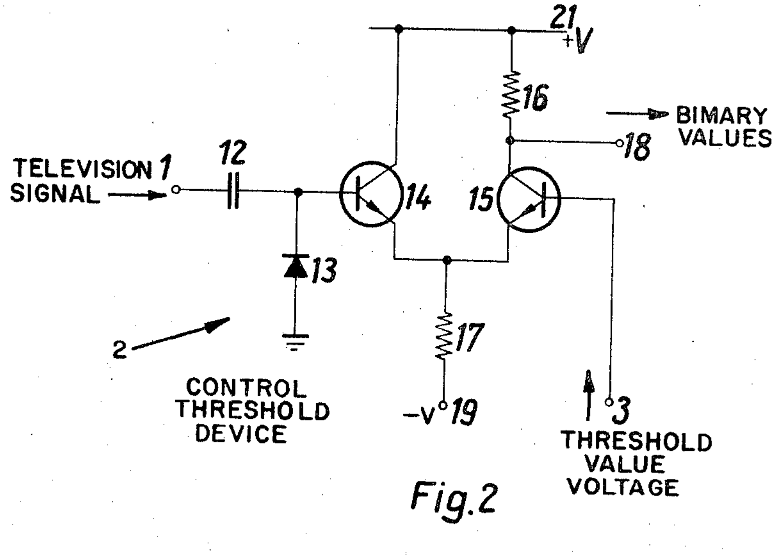
FIG. 2 is a schematic diagram of a threshold value circuit with provision for a variable threshold value.

FIG. 2 shows a simple practical embodiment of the controllable threshold value device 2. The television signal is fed to the circuit arrangement at point 1 and passes through a condenser 12 to the base of a transistor 14. A black control diode 13 restores the direct voltage components to the television signal. Transistors 14 and 15 have a common emitter resistance 17 and operate as a differential amplifier, whose output signal is taken from the load resistance 16 and is delivered to the output terminal 18 of the circuit. The range within which transistors 14 and 15 operate as a linear amplifier is small compared to the amplitude of the television signal. The result is that for all parts of the television signal whose amplitude is more positive than the threshold value voltage fed in at the point 3, transistor 14 is conducting and transistor 15 is nonconducting. On the other hand, in the case of smaller amplitudes than that of the control voltage at point 3, transistor 14 is blocked and transistor 15 is conducting. The binary signals can be fed out of the circuit arrangement at output 18, and after any necessary amplification, can be delivered to the transmission or storage device. At points 19 and 21 of the circuit a power voltage is delivered which is above ground at point 21 and below ground at point 19.

The threshold value device 8 can be similarly constructed, but in this case there is fed to the base of the transistor 15 a constant voltage or a voltage corresponding to one-half the amplitude of the binary signals.

Figure 3:
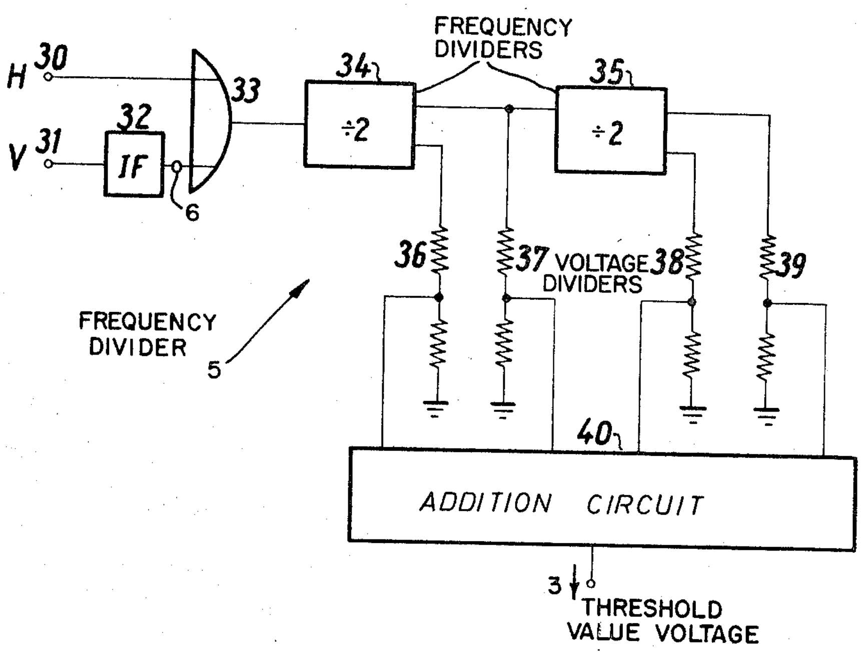
FIG. 3 is a schematic diagram of a circuit arrangement for producing a control voltage for the circuit according to FIG. 2, FIGS. 4A–4G are voltage-time diagrams for various voltages and signals.

FIG. 3 shows schematically a circuit arrangement for generating the control voltage which is fed at point 3 to the controllable threshold value device. To terminals 30 and 31 respectively are fed the horizontal and the vertical frequency pulses H and V. In the pulse former 32 is formed from the vertical frequency pulse V at point 6, a shorter pulse, which is situated in time between two succeeding horizontal frequency pulses. Both this short pulse and the horizontal frequency pulse are fed to an OR-circuit 33. The output of OR-circuit 33 comprises pulses which appear at the time of horizontal frequency pulses H as well as at the time of short frequency pulses V. This output pulse series is fed to a frequency divider (flip-flop) 34, whose one output is connected to a further frequency divider 35. The output signals of the two frequency dividers are fed to the addition circuit 40 through the voltage dividers 36, 37, 38 and 39. The voltage dividers 36, 37, 38 and 39 exhibit different division ratios, for example 1, 1/2, 1/4 and 1/8, whereby at the output 3 voltages of different value are obtained according to the condition of the counter which includes frequency dividers 34 and 35. As a result of the continuous switching of the counter by the pulses H and V a step function occurs at output 3 and is fed as a control voltage to the controllable threshold value device 2.

Figure 5:
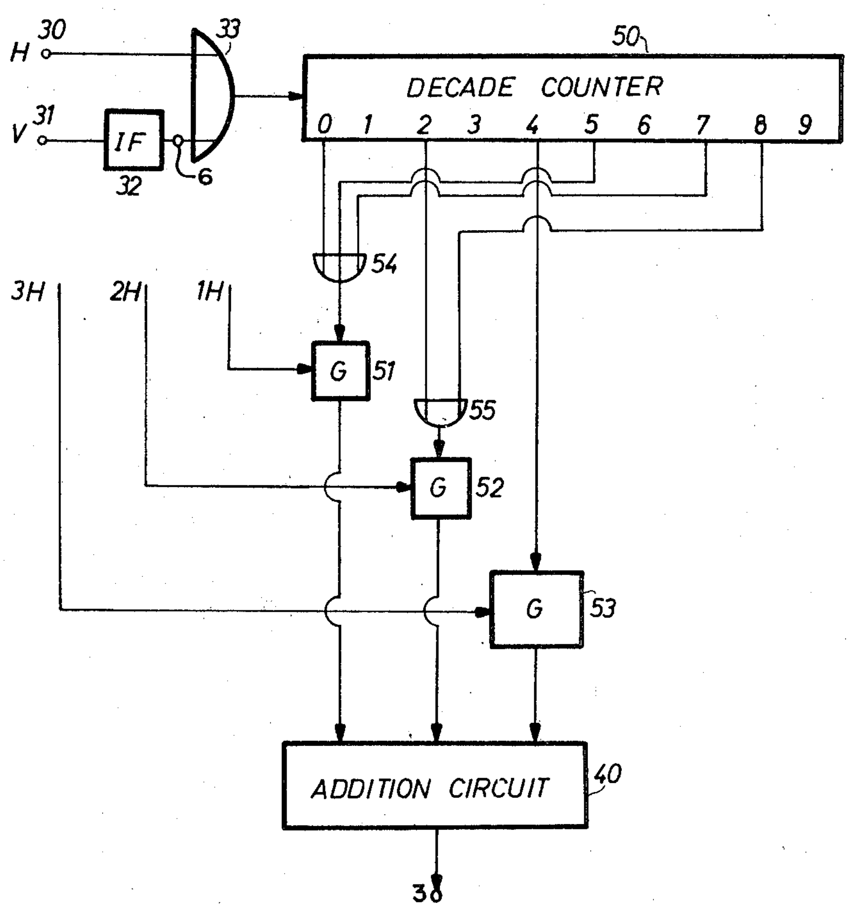
FIG. 5 is a schematic block diagram of an alternative system to that shown in FIG. 3.

The conversion of the output signals of the frequency divider into voltages of various values can also be effected otherwise than in the manner represented. For example, the upper terminal points of the voltage divider can be connected to a constant operating voltage, and electronic switches can be inserted between the tapping points of the voltage divider and the inputs of the adding circuits, the electronic switches being controlled by the output voltages of the frequency divider as illustrated in FIG. 5. Alternatively, the electronic switches can also be introduced into the lead for the constant voltage to the voltage dividers.

The control voltage produced by the circuit arrangement according to FIG. 3 exhibits four steps. Obviously the circuit may be extended by adding further frequency dividers so that more than four steps are possible. However, if there is an increase in the number of steps, the additional line structure, which results from the successive transmission of the binary signals corresponding to the individual steps, becomes coarser. Furthermore, with vertical frequency switching of the steps, the flickering effect becomes more intense, so that limits are set to the increase in the number of steps. On the other hand a low number of steps, for example as already described, is not adequate for many applications of such television transmissions. Consequently, further alternatives of the invention, as explained in conjunction with FIG. 4, are proposed.

Figures 4A, 4B, 4C, 4D, 4E, 4F, 4G:
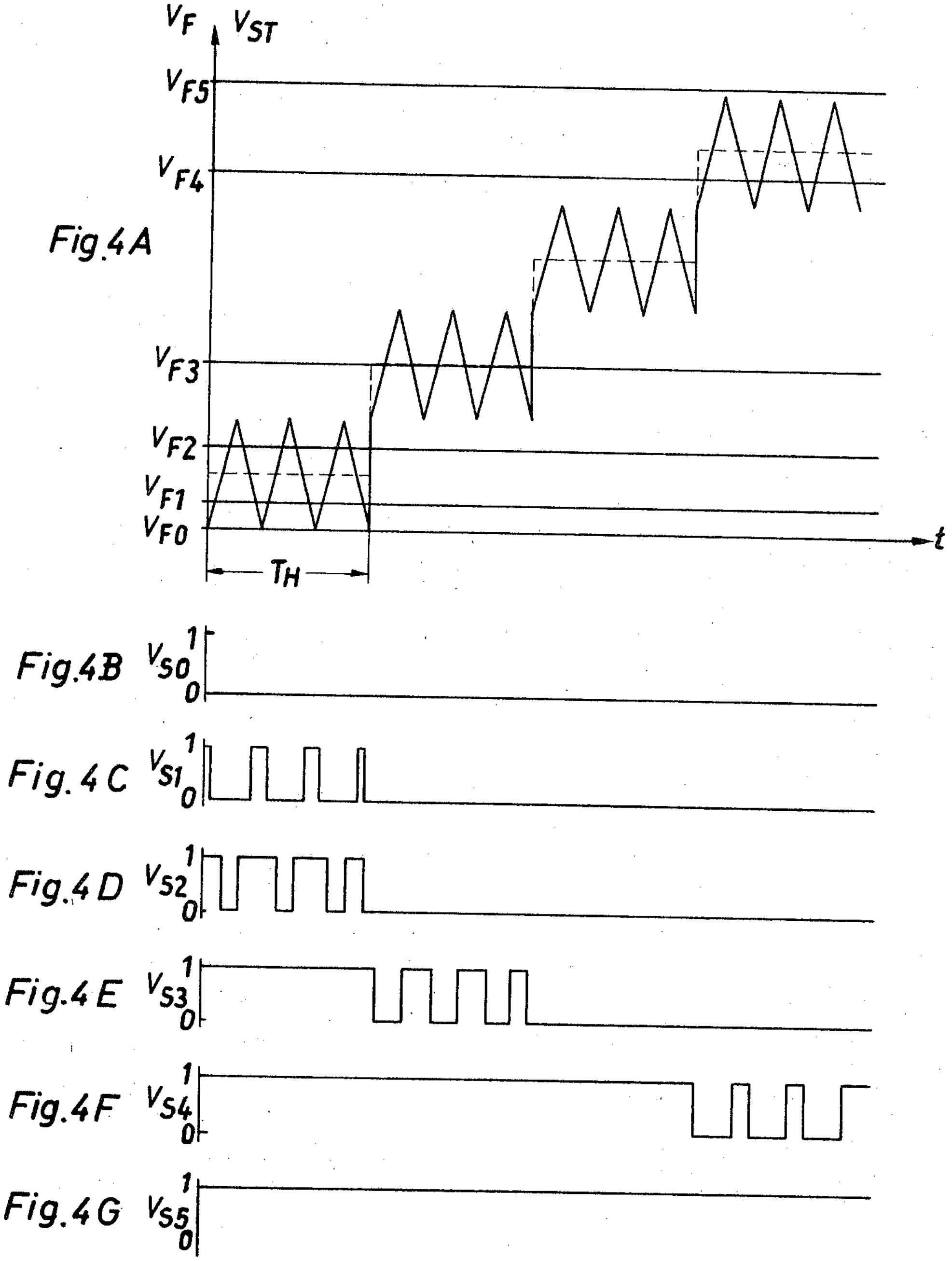

FIG. 4A shows a voltage-time diagram, upon which is drawn in broken line the step curve shown as waveform 4 in FIG. 1, but upon which there is superimposed in accordance with a further development of the invention a triangular-shaped alternating voltage. The peak value of the alternating voltage is equal to the step height of the step curve. The frequency of the alternating voltage is greater than the switching frequency of the steps by between one and two orders of magnitude, the switching frequency being equal, for example, to the line frequency. That is to say the switching duration is equal to the illustrated line duration $T_H$. At the upper part of the FIG. 4A are also inscribed several voltage values $V_{F0}$ to $V_{F5}$ of the television signal, which voltages are assumed, for the sake of clearness, to be independent of time. In FIGS. 4B–4G are represented voltage curves $V_{S0}$–$V_{S5}$, which are provided with indexes corresponding to the individual values of the transmitted television signal.

For example, if the voltage of the television signal is $V_{F0}$ (black,) then at any time it is smaller than the control voltage $V_{ST}$. The threshold value of the controllable threshold value device is therefore not exceeded at any time and consequently no signal will be delivered by the threshold value device 2. This fact is represented in the line of FIG. 4B indicated as $V_{S0}$.

In somewhat brighter points of the picture, the amplitude of the television signal rises, for example, to $V_{F1}$, which, within each period of the alternating voltage, is temporarily greater than the threshold value. Therefore, the pulses are transmitted which are represented in FIG. 4C as line $V_{S1}$. The width of these pulses increases with increasing amplitude of the television signal as shown by signal $V_{S2}$ in FIG. 4D, until a continuous pulse sets in as shown by signal $V_{S3}$ in FIG. 4E. If the amplitude of the television signal rises further, there will then result, during the second step of the control signal, pulses, which initially are short and which afterwards become wider as is represented by signal $V_{S3}$. At the amplitude value $V_{F4}$ of the television signal, three steps have already been completely exceeded, while at the fourth step the television signal is still within the range of the alternating voltage. For the maximum value (white) of the television signal $V_{F5}$, a continuous signal is transmitted as is represented by the signal $V_{S5}$.

The alternating voltage can also be superimposed upon the television signal, which however does not change the principle of the mode of operation of the transmission method. By the introduction of the alternating voltage, referred to in the following description as an auxiliary carrier, it is possible to transmit all of the brightness values of the television signal. By the processes described in conjunction with FIGS. 4A–4G, the auxiliary carrier is pulse-width modulated. In principle it is also possible to choose the auxiliary carrier so high that its period duration corresponds at least to the duration of one picture point of the television signal. In this case, however, in order to maintain a large signal-to-noise ratio for the binary transmission, the band width of the transmission channel must be substantially increased. Otherwise the sides of the transmitted pulses would be cut off in such a manner that amplitude fluctuations and noise voltages resulting during the transmission or storage would, upon reception or reproduction, become noticeable as additional pulse-width modulation and would therefore have a disturbing effect.

According to one development of the invention, the frequency of the auxiliary carrier is so selected that it lies below the highest frequency of the television signal. The transmission of the lower frequencies of the picture signal is then effected by the auxiliary carrier together with the step curve, so that any desired intermediate values for the brightness are transmitted, while the transmission of the higher frequencies of the picture signal are effected only by making use of the step curve, whereby the brightness values are transmitted in step formation. Accordingly the reproduction of the large surfaces of a television picture takes place without brightness graduation, while the parts of the television signal which correspond to edges and smaller surfaces are associated with definite brightness stages. In order to prevent the auxiliary carrier from having a disturbing effect during reproduction, it may be coupled to the line frequency and to the frame frequency as is the color carrier in television signals. Instead of the step curve, the television signal may also be superimposed upon the auxiliary carrier, which is practically equivalent in mode of operation and cost.

By suitable choice of the frequency of the control voltage as well as of the auxiliary carrier frequency, the method according to the invention is suitable also for transmitting or storing color television signals.

Because the picture tube 10 is controlled by binary signals and is therefore illuminated, outside the dark period, only by a constant brightness, there will result from the employment of the method according to the invention a different reproduction of the grey values than takes place in the conventional transmission method. This can be compensated for by introducing at the transmitting side a simple gradation distortion. This consists in selecting a different height for the individual steps of the step curve. The alternating voltage shown as a triangular curve may be generated so as not to contain any parts which are linear with time but are, for example, of parabolic shape, or, if necessary, are formed by sinusoidal oscillation or by a rectified sinusoidal oscillation.

Figure 6:
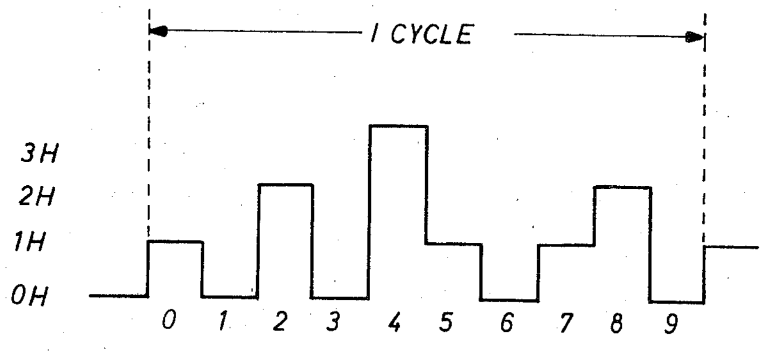
FIG. 6 is a waveform diagram of the output waveform from the circuit of FIG. 5.

When it is desired to have the threshold value signal compensated by assuming values corresponding to a dark picture value more frequently than to a bright picture value, the system illustrated in FIG. 5 may be used. This system is similar at both ends to that shown in FIG. 3, but uses a different counter and reference voltage system. A decade counter 50 counts down the input frequency from OR-gate 33 and drives gates 51, 52 and 53. OR-gates 54 and 55 may respectively feed gates 51 and 52. Three voltage level signals, respectively H, 2H and 3H units above zero, feed gates 51, 52 and 53 and are gated through to addition circuit 40 by the counter. The output waveform on line 41 in the embodiment illustrated is shown in FIG. 6.

Figure 7:
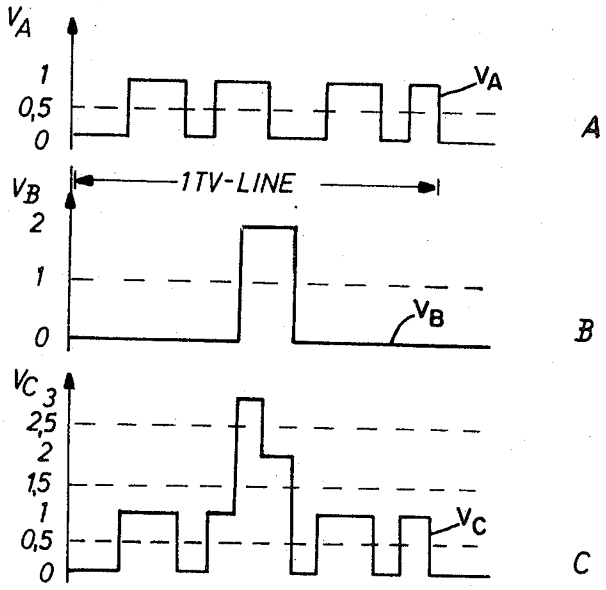
FIGS. 7A–7C are voltage-time diagrams of two binary signals and the superimposed signal of these.

For transmitting two binary television signals simultaneously over one channel these signals might be added with two different amplitudes. FIG. 7A is showing one of these signals $V_A$ with the amplitude of one unit. The other signal $V_B$ is shown in FIG. 7B and has the amplitude of two units. Superimposing these signals the signal $V_C$ is generated having three amplitude steps—additional to the zero level.

Receiving the signal $V_A$ or $V_B$, e.g., by an embodiment shown in FIG. 1, the threshold value normally will be at the half amplitude as it is shown in FIGS. 7A and 7B by dotted lines.

Figure 8:
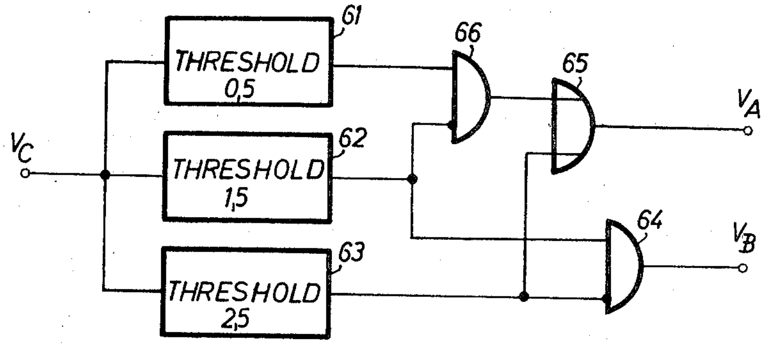
FIG. 8 is a schematic diagram of a separation circuit.

Receiving the superimposed signal $V_C$ it is fed to the inputs of the threshold devices 61, 62, 63 shown in FIG. 8. The threshold values of these circuits has been chosen at 0.5, 1.5 and 2.5 as it is shown in FIG. 7C. If the signal $V_C$ is larger than the threshold value 1.5 but not larger than the threshold value 2.5 the AND-gate 64 is generating a signal corresponding to the signal $V_B$. The OR-gate 65 is generating a signal corresponding to the signal $V_A$, if the amplitude of the signal $V_C$ exceeds the threshold value 2.5 or is within the range between the threshold values 0.5 and 1.5. This condition is detected by the AND-gate 66.

Figure 9:
FIG. 9 is a voltage-time diagram showing a binary signal with synchronizing bursts.

FIG. 9 shows a time diagram of a binary television signal having synchronizing bursts 67 during the vertical and horizontal flyback interval. These synchronizing burst may be selected by filter circuits as it is well known in the art. The output signals of these filter circuits can be used for synchronizing the vertical and the horizontal deflection circuits.

I claim:

1. A method for the conversion of a television signal into binary signals comprising the steps of a. generating a threshold value signal which assumes periodically different successive values within an amplitude range of said television signal, b. creating binary signals at one of two possible values when amplitude of said television signal is greater than the instantaneous value of said threshold value signal, and c. creating binary signals at the other of said two possible values when amplitude of said television signal is less than an instantaneous value of said threshold value signal, whereby said binary signals are conveniently adapted for transmission and storage.

2. A method according to claim 1 wherein the threshold value signal is caused to assume more frequently values which correspond to dark parts of a television picture than it does those step values which correspond to brighter parts of the picture.

3. A method according to claim 1 adapted to the simultaneous transmission of a plurality of television signals comprising the additional step of associating unique amplitude levels of the binary signals with one signal of said plurality of television signals.

4. The method of claim 1 wherein said creating step comprises creating successive varied step values.

5. The method of claim 2 wherein said creating step comprises superimposing an alternating value on the varied step values.

6. A system for processing television signals to form corresponding binary signals adapted for convenient transmission and storage comprising:

a. means for generating a threshold value signal which assumes periodically different successive values within an amplitude range of said television signal, and b. binary signal generating means for generating a binary signal having one of two possible values when amplitude of said television signal is greater than the instantaneous value of said threshold value signal and having the other of said two possible values when amplitude of said television signal is less than said instantaneous value.

7. A system according to claim 6, further comprising:

a. means for applying said binary signals to the input of a video amplifier to generate amplified binary signals, and b. means for applying said amplified binary signals to a picture reproduction device.

8. A system according to claim 6, further comprising:

a threshold value means connected in the path of said binary signals for suppressing noise and amplitude fluctuations.

9. A system according to claim 6 wherein said periodically different successive step values remain constant for a period coincident with the half frame period of said television signal.

10. A system according to claim 6 wherein said periodically different successive step values remain constant for a period coincident with the whole frame period of said television signal.

11. A system according to claim 6 wherein said periodically different successive step values remain constant for a period coincident with a line period of the television signal.

12. A system according to claim 11 wherein said threshold value signal assumes different step values for corresponding lines of successive pictures.

13. A system according to claim 12 further comprising:

a. a counting circuit for switching said step values of said threshold signal, and b. means responsive to horizontal frequency pulses and vertical frequency pulses from said television signal for synchronizing said counting circuit.

14. A system according to claim 13 further comprising:

a. a plurality of voltage dividers having respectively different division ratios and adapted to provide a plurality of divider output signals in response to the output of said counting circuit, and
b. an adding circuit responsive to said divider output signals for providing the step values of said threshold signal.

15. A system according to claim 6 further comprising means for superimposing a periodic voltage on said television signal, whose period duration is smaller than the duration of one line of the television signal, whereby the superimposed signal is then compared with the threshold value signal.

16. A system according to claim 15 wherein said periodic voltage is a triangle wave.

17. A system according to claim 15 wherein said periodic voltage is a sinusoidal wave.

18. A system according to claim 15 wherein the frequency and phase position of said periodic voltage is coupled with the line frequency of said television signal.

19. A system according to claim 6 further comprising means for adding an alternating voltage with predetermined frequencies to the binary signals during the blanking spaces of the television signals, thereby to synchronize a reproduction apparatus.

20. A system according to claim 6, wherein said binary signal generating means further comprises:

a. two transistors each having base, emitter and collector,
b. means for connecting together the emitters of the two transistors,
c. means for applying the television signals to the base of one transistor,
d. means for applying the threshold value signals to the base of the other transistor, and
e. a load resistance connected to the collector of one of the transistors at a junction point, whereby the binary signals are taken from said junction point.

* * * * *

PO-1050
(5/69)

UNITED STATES PATENT OFFICE
CERTIFICATE OF CORRECTION

Patent No. 3,637,927 Dated January 25, 1972

Inventor(s) Gerhard Krause

It is certified that error appears in the above-identified patent and that said Letters Patent are hereby corrected as shown below:

IN THE CLAIMS:

Claim 5, line 1: change "2" to --4--.

Signed and sealed this 15th day of August 1972.

(SEAL)
Attest:

EDWARD M.FLETCHER,JR.
Attesting Officer

ROBERT GOTTSCHALK
Commissioner of Patents